United States Patent
Yoshikawa et al.

[11] Patent Number: 6,016,238
[45] Date of Patent: *Jan. 18, 2000

[54] SPINDLE MOTOR FOR DRIVING DISK

[75] Inventors: Shouichi Yoshikawa; Shinya Yukino, both of Yonago; Masahiro Naba, Osaka, all of Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/531,074

[22] Filed: Sep. 20, 1995

[30] Foreign Application Priority Data

Sep. 21, 1994 [JP] Japan .................................. 6-226627

[51] Int. Cl.⁷ .................................................. G11B 17/02

[52] U.S. Cl. .................................... 360/99.08; 360/98.07; 360/99.12

[58] Field of Search .............................. 360/98.07, 99.08, 360/99.04, 99.09, 99.11, 99.12, 98.08; 369/290; 384/113, 112, 123, 107, 226–228

[56] References Cited

U.S. PATENT DOCUMENTS

| | | | |
|---|---|---|---|
| 4,733,388 | 3/1988 | Fujimoto et al. | 369/290 |
| 4,864,443 | 9/1989 | Peterson | 360/99.12 |
| 4,874,976 | 10/1989 | Oshawa et al. | 360/97.01 |
| 5,333,079 | 7/1994 | Takegami et al. | 360/99.08 |
| 5,487,608 | 1/1996 | Leuthold et al. | 384/113 |

*Primary Examiner*—Sara Crane
*Attorney, Agent, or Firm*—Wenderoth, Lind & Ponack, L.L.P.

[57] ABSTRACT

A magneto-optic disk-driving spindle motor has a rotary shaft for driving a spindle hub. Bearings support the rotary shaft for free rotation. A stator core is fixed relative to the bearings, and a driving magnet is fixed relative to the spindle hub. The spindle hub is provided with an upper side having a magneto-optic disk loading face for receiving and supporting a magneto-optic disk, and an axial part that is to be fitted into the center hole of the magneto-optic disk. A lower side of the spindle hub has a connection for connecting the axial upper end of the rotary shaft to the lower shaft of the spindle hub so as to fix the spindle hub to the rotary shaft. By having the axial part on the spindle hub as opposed to the end of the rotary shaft, the rotary shaft can have a diameter other than the diameter required for engagement with the center hole of the magneto-optic disk.

13 Claims, 3 Drawing Sheets

SPINDLE MOTOR FOR DRIVING DISK

BACKGROUND OF THE INVENTION

The present invention relates to a disc-driving spindle motor in the OA/AV (Office Automation/Audio-Visual) field, particularly, for an audio/video apparatus using a digital disc/disk medium accommodated in a cartridge or a computer memory device.

A Audio-visual apparatuses and computer memory devices have been developed rapidly to be compact and denser in recent years. Among the technological innovations of this development, especially miniaturization, noise reduction, low power consumption, and long service life are required for a spindle motor rotating a disc.

With a compact spindle motor, the space assigned to a driving magnet or a stator coil determining the magnetic characteristics of the spindle motor is naturally limited, which might cause deterioration of the characteristics of the spindle motor. Meanwhile, a bearing of the motor is an important factor to determine the performance of the spindle motor.

A hydro-dynamic bearing has been noted and employed as a bearing which can satisfactorily cope with the above need. The hydro-dynamic bearing is constructed by a cylindrical rotary shaft and a hollow cylindrical sleeve metal fitted via a gap with the rotary shaft. A fluid (oil in many cases) is filled in the gap through herringbone grooves or the like formed in either of the rotary shaft and sleeve metal (sleeve bearing). The bearing supports a rotor by pressure generated in the fluid in accordance with the rotation of the rotor. This type of structure of the bearing is superior for a bearing of a spindle motor in principle in that the mechanism occupies little volume, noises during the rotation are lessened because of the arrangement of the rotor being supported via the fluid, shock resistance is high, and axial vibrations are reduced owing to an integrated effect where the load is supported at the whole periphery of the rotary shaft.

A conventional spindle motor will be described below with reference to drawing FIG. 3.

FIG. 3 is a sectional view of a conventional example. In FIG. 3, 1 is a magneto-optic disc medium (referred to as "a disc" hereinafter). 2 is a mounting plate formed of a ferromagnetic material and set in the disc 1. 16 is a spindle hub for receiving the disc 1. The spindle hub 16 has a clamp magnet 6 attached thereto which works to fix the disc 1 to the spindle hub 16 by a magnetic attraction force.

A rotary shaft 17 is installed at the center of the spindle hub 16, which is rotated together with the spindle hub 16 and the disc 1, thus serving as a rotary center for the spindle hub 16 and the disc 1. The rotary shaft 17 is supported by two ball bearings 18, 19.

A rotary driving force for the motor is generated by a rotary magnetic field formed by a stator core 11, having a stator coil 12 wound therearound when electricity is supplied to the stator core 11 to excite the stator core 11, and by a driving magnet 10 surrounding the periphery of the stator core 11 and magnetized with many polarities. A stator coil 12 is wound around the stator core 11. The driving magnet 10 is fixed to an inner peripheral surface of a frame 20, and the frame 20 has an upper end part thereof bent inward in FIG. 3 and fixed to the spindle hub 16. A rotor is constituted by the driving magnet 10 and the frame 20. The disc 1 is rotated by this rotor via the spindle hub 16. Additionally, the stator core 11 is secured to a bracket 7 and the stator coil 12 is wired to a printed board 9, thereby working as a driving force source.

In the above conventional constitution, far from satisfying the need for miniaturization, etc. described above, an issue that must be solved first is that there is a possibility that lubricating oil of the rotary shaft adheres to the disc because the disc is directly fitted with the rotary shaft.

SUMMARY OF THE INVENTION

The object of the present invention is therefore to provide it driving spindle motor in which a disc is not necessary to have a disc directly fitted with a rotary shaft, thereby eliminating the possibility that lubricating oil of the rotary shaft adheres to the disc.

In order to accomplish the above object, according to an aspect of the present invention, the spindle motor is provided with a rotary shaft, bearings for freely rotating the rotary shaft, and a spindle hub which is fixed to the rotary shaft and has a face to load a disc thereon and an axial part to be fitted in a center hole of the disc.

The disc is not directly fitted with the rotary shaft, but is fitted in the axial part of the spindle hub to which the rotary shaft is secured, so that there is no possibility that lubricating oil of the rotary shaft is adhered to the disc.

According to a different aspect of the present invention, an outer diameter of the rotary shaft can be set smaller than an outer diameter of the axial part of the spindle hub.

The invention can achieve the following object in addition to the object described above. That is, an inner diameter of a hole 1a formed at the center of the disc 1 accommodated in a cartridge in a digital disc apparatus (e.g., magneto-optic disc apparatus) using the conventional spindle motor of FIG. 3 is generally regulated to be a diameter of 4 mm, so as to secure compatibility. Consequently, an outer diameter of the rotary shaft 17 to be fitted in the hole 1a is a diameter of 4 mm, and inner diameters of the ball bearings 18, 19 should also be, at a diameter of 4 mm. However, if the motor is made compact, outer diameters of the ball bearings 18, 19 are subject to constraints. In other words, the lives of the ball bearings 18, 19 are undesirably shortened when the outer diameters of the ball bearings 18, 19 are simply reduced while the outer diameter of the rotary shaft is kept unchanged. On the other hand, there is an issue in that the magnetic characteristics are deteriorated when the outer diameters of the ball bearings 18, 19 are increased. In contrast, by a further aspect of the present invention the outer diameter of the rotary shaft supported by the bearings can be made smaller than the inner diameter of the center hole of the disc. Accordingly, the motor can be compact and thin.

In the structure according to the aspects of the present invention, a member to be fitted in the center hole of the disc is not the rotary shaft, but the axial part of the spindle hub fixed to the rotary shaft. Therefore, even when the inner diameter of the center hole of the disc is regulated in compliance with standards, it is enough to design the axial part to conform to the standards. That the outer diameter of the rotary shaft can be freely determined because of the fact that the rotary shaft is not fitted with the center hole of the disc. Therefore, the outer diameter of the rotary shaft can be made smaller than a value that corresponds to the inner diameter of the center hole, and the bearing, etc. can be made compact corresponding to the smaller rotary shaft. The motor as a whole can eventually become compact and thin without lowering the magnetic characteristics.

According to a further, different aspect of the present invention, the outer diameter of the rotary shaft can be equal to or larger than the outer diameter of the axial part of the spindle hub.

In addition to the effect and operation as described hereinabove, the arrangement allows the outer diameter of the rotary shaft to be equal to or larger than the inner diameter of the center hole of the disc when rigidity is required for the bearings. That is, the outer diameter of the rotary shaft can be designed large and also the bearings can be made large, to thereby increase the rigidity of the bearings.

According to a still further aspect of the present invention, the bearings can be ball bearings.

According to a yet further aspect of the present invention, the bearing can be so constituted as to include a sleeve metal (sleeve bearing) supporting the rotary shaft in its radial direction and a thrust plate supporting the rotary shaft in its axial direction.

Further, according to a yet different aspect of the present invention, the bearing can be a hydro-dynamic bearing which has a herringbone groove formed in either the rotary shaft or the sleeve metal.

In the above constitution, the spindle motor realized can maintain such characteristics as low power consumption, reduced noises, and long service life without the magnetic characteristics deteriorating.

BRIEF DESCRIPTION OF THE DRAWINGS

These and other objects and features of the present invention will become clear from the following description taken in conjunction with the preferred embodiments thereof and with reference to the accompanying drawings, in which.

DETAILED DESCRIPTION OF THE PREFERRED EMBODIMENTS

Figure 1:
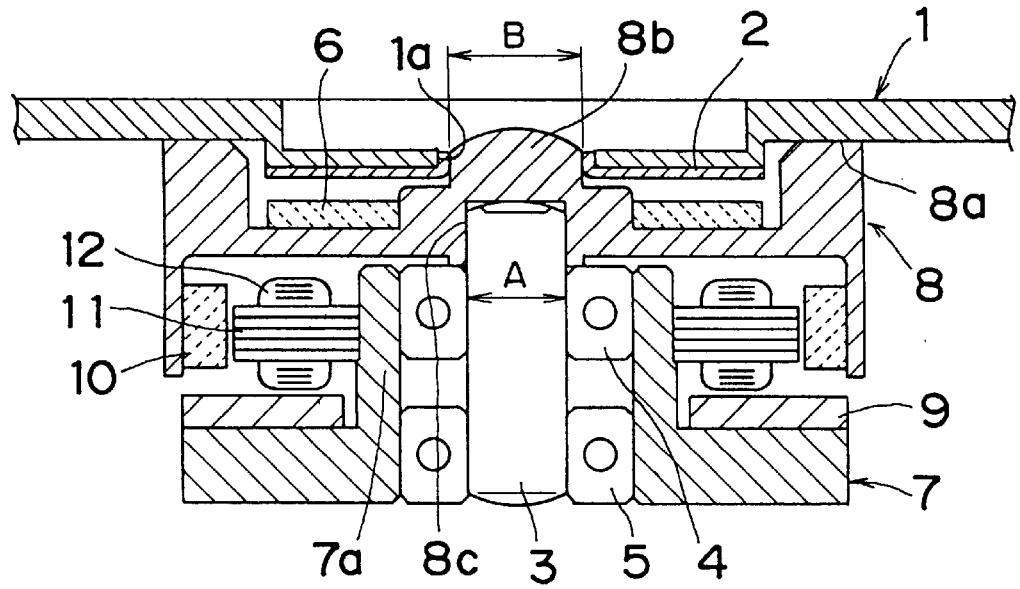
FIG. 1 is a sectional view showing a structure of a disc-driving spindle motor according to a first embodiment of the present invention.

Before the description proceeds, it is to be noted that like parts are designated by like reference numerals throughout the accompanying drawings.
(First Embodiment)

A first embodiment of the present invention will be described with reference to the drawing.

FIG. 1 is a sectional view of a disc-driving spindle motor according to the first embodiment of the present invention. In FIG. 1, 1 is a magneto-optic disc medium (referred to as "a disc" hereinafter). 2 is a mounting plate formed of a ferromagnetic material and set in the disc 1. 8 is a spindle hub of a magnetic material having a face 8a on which the disc 1 is loaded and an axial part 8b to be fitted in a center hole la of the disc 1. A rotary shaft 3 is securely pressed into a recessed part 8c at a central part of a face opposite to the face 8a of the spindle hub 8. The rotary shaft 3 can be fixed in a different manner than the above pressing. The recessed part 8c and the axial part 8b are formed to be coaxial.

A clamp magnet 6 is set in the periphery of the axial part 8b of the spindle hub 8. A magnetic attraction force of the clamp magnet 6 works to secure the disc 1 to the face 8a of the spindle hub 8. The rotary shaft 3 is supported by ball bearings 4, 5 to which a central cylindrical part 7a of a bracket 7 is secured.

A rotary driving force for the motor is generated by a rotary magnetic field formed by a stator core 11 excited by electricity supplied from a stator coil 12 wound therearound, and a driving magnet 10 in the periphery of the stator core 11 magnetized with many polarities. The driving magnet 10, secured to an inner peripheral surface of the spindle hub 8, constitutes a rotor, rotating the disc 1. The stator core 11 is secured to the central cylindrical part 7a of the bracket 7, and the stator coil 12 is wired to a printed board 9 supported by the bracket 7 thereby to become a driving force source.

In the first embodiment of the present invention, a member to be fitted in the center hole 1a of the disc 1 is not the rotary shaft 3, but the axial part 8b of the spindle hub 8 secured to the rotary shaft 3. Therefore, even when an inner diameter of the center hole 1a of the disc 1 is regulated by standards, it is enough to design the axial part 8b in conformity with the standards. Since the rotary shaft 3 has nothing to do with the center hole 1a when the disc 1 is to be fitted, an outer diameter of the rotary shaft 3 can be freely designed.

In case that the outer diameter of the rotary shaft 3 is made smaller than in the conventional motor, given that an outer diameter of the axial part 8b of the spindle hub 8 to be fitted with the center hole 1a of the disc 1 is A and the outer diameter of the rotary shaft 3 is B, A and B are so set as to satisfy B<A. The outer diameter of the rotary shaft 3 can hence be smaller than the inner diameter of the center hole 1a of the disc 1, namely, the outer diameter of the axial part 8b of the spindle hub 8. As a result, inner diameters of the ball bearings 4, 5 can be reduced, and consequently outer diameters of the ball bearings can be reduced. As can be seen in the figures, the rotary shaft therefore has an outer diameter at a position where the bearings 4, 5 support the rotary shaft that is smaller than the outer diameter of the axial part 8b of the spindle hub. The motor can thus be miniaturized without lowering magnetic characteristics. Moreover, since the disc 1 is not directly fitted with the rotary shaft 3 in the above constitution and the disc 1 is fitted in the axial part 8b of the spindle hub 8 to which the rotary shaft 3 is secured, lubricating oil of the rotary shaft 3 is never adhered to the disc 1.

The face 8a and the axial part 8c of the spindle hub 8 can be formed of separate members and combined into one body.
(Second Embodiment)

A second embodiment of the present invention will be described with reference to the drawing.

Figure 2:
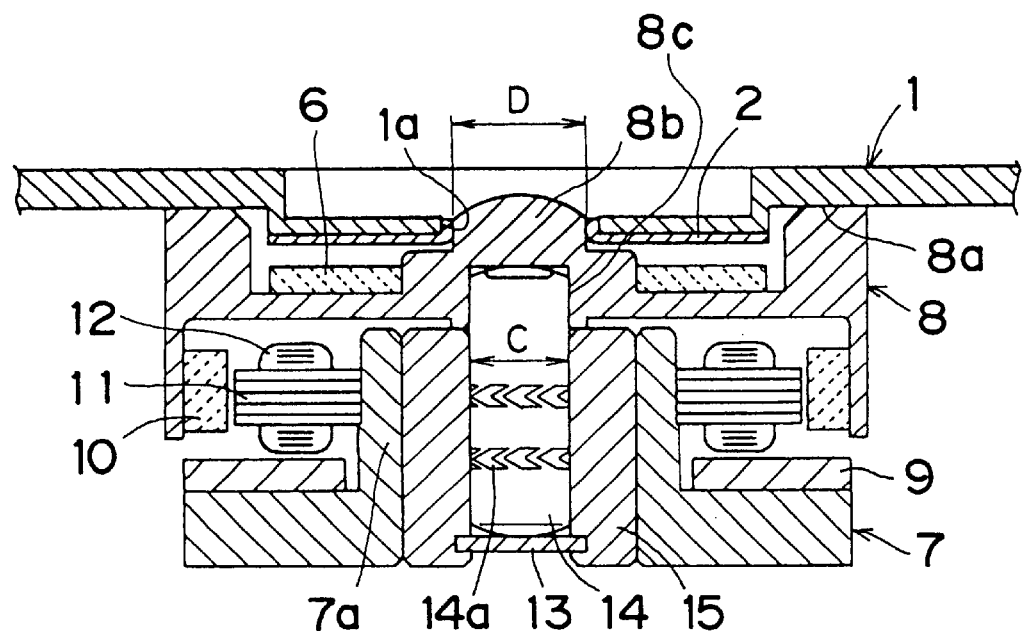
FIG. 2 is a sectional view showing a structure of a disc-driving spindle motor according to a second embodiment of the present invention.

FIG. 2 is a sectional view of a disc-driving spindle motor according to the second embodiment of the present invention. Parts of the same structure and function as in the first embodiment are designated by the same numerals and the description thereof will be omitted here.

14 is a rotary shaft. 14a is a herringbone groove formed in the rotary shaft 14. The rotary shaft 14 is supported in its radial direction by a sleeve metal (sleeve bearing) 15 and in its thrust direction by a thrust plate 13.

The thrust plate 13 is fixed to the sleeve metal 15 which is secured to the central cylindrical part 7a of the bracket 7. A lubricating fluid (for example, oil) is filled in a gap between the rotary shaft 14 and the sleeve metal 15 and in a gap between the rotary shaft 14 and the thrust plate 13 (a reference numeral for the fluid is not indicated because it is difficult to show in the drawing). Owing to the herringbone grooves 14a formed in the rotary shaft 14, a pressure is generated in the lubricating fluid when the rotary shaft 14 rotates, which constitutes a hydro-dynamic bearing mechanism. On the other hand, a thrust bearing mechanism is formed by a lower end face of the rotary shaft 14 and an upper face of the thrust plate 13. The lubricating fluid filled in the gap between the rotary shaft 14 and the thrust plate 13 prevents the abrasion of the thrust bearing mechanism.

Supposing that the outer diameter of the axial part 8b of the spindle hub 8 to be fitted in the center hole 1a of the disc 1 is C and the outer diameter of the rotary shaft 14 is D, C and D are set to hold D<C. The rotary shaft 14 therefore has an outer diameter at a position where said bearing 15 support the rotary shaft 14 that is smaller than the outer diameter of the axial part 8b of the hub. A peripheral velocity is decreased when the outer diameter of the rotary shaft 14 is reduced as above. In other words, the lives of the bearings can be improved and the consumption of current in the motor can be reduced. Since the space for the magnet and coil is secured, the motor can be compact in size without the magnetic performance deteriorating. The disc 1 is not directly fitted with the rotary shaft 3, but is fitted with the axial part 8b of the spindle hub 8 to which the rotary shaft 3 is secured, and therefore there is no possibility that the lubricating oil of the rotary shaft 3 is adhered to the disc 1.

Although the herringbone grooves 14a are formed in the rotary shaft 14 in the second embodiment, the same effect is attainable even when the herringbone grooves are formed in the sleeve metal 15.

If the hydro-dynamic bearing is not particularly required, the rotary shaft can be provided with a sleeve metal (sleeve bearing) alone without a herringbone groove. Needless to say, in such a case, the same effect as in the first embodiment is naturally obtained.

(Third and Fourth Embodiments)

Figure 4:
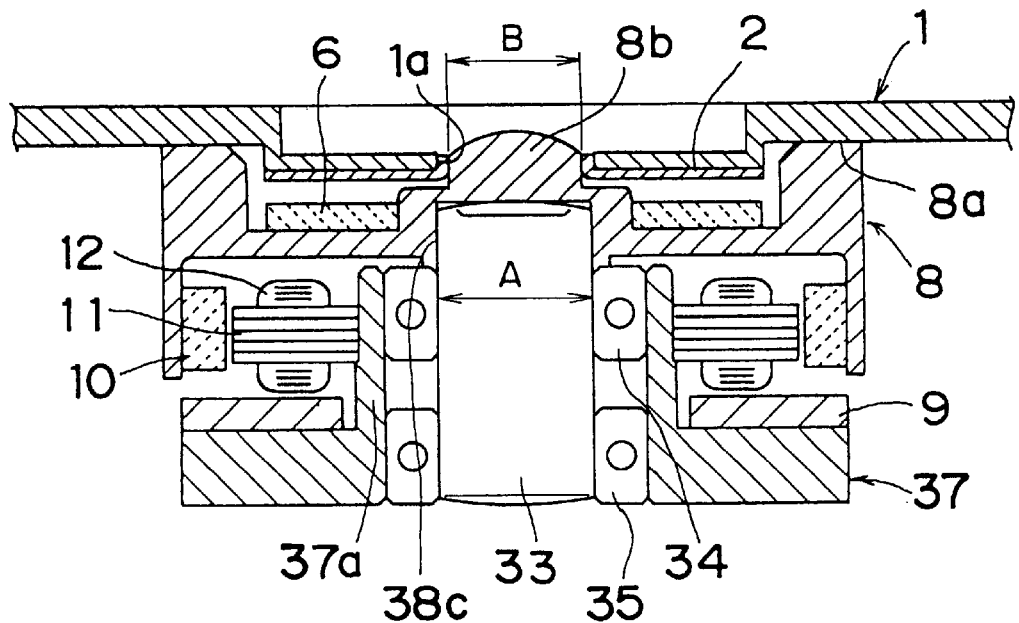
FIG. 4 is a sectional view showing a structure of a disc-driving spindle motor according to a third embodiment of the present invention.
Figure 5:
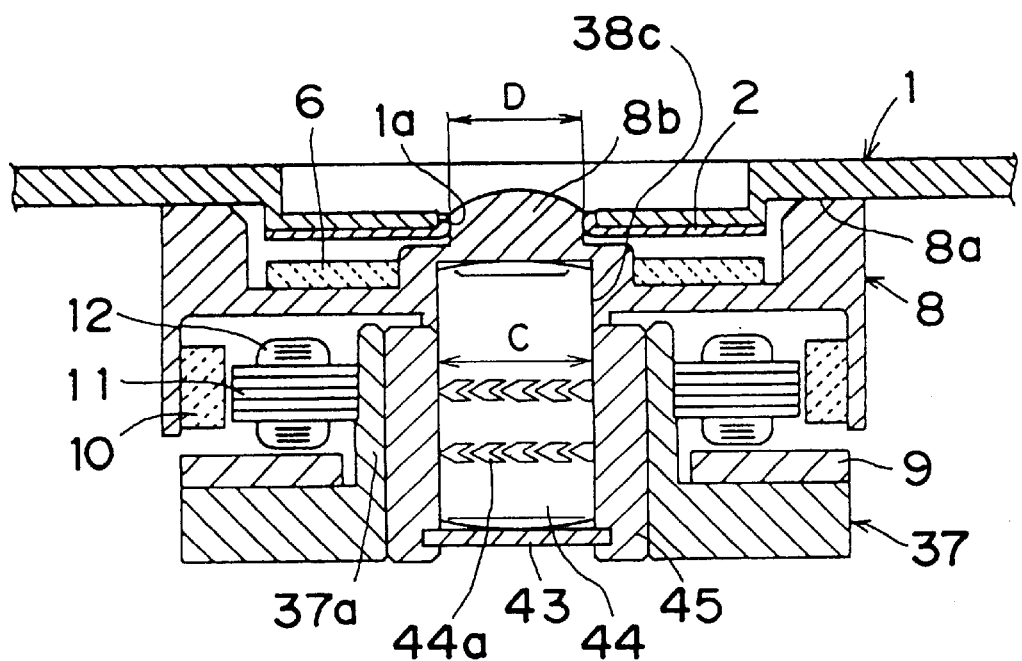
FIG. 5 is a sectional view showing a structure of a disc-driving spindle motor according to a fourth embodiment of the present invention.

In third and fourth embodiments of the present invention, as shown in FIGS. 4 and 5, outer diameters B, D of the rotary shafts 33, 44 are set to be equal to or larger than the outer diameters A, C of the axial parts 8b of the spindle hubs 8 of the motors in the first and second embodiments, respectively. In FIGS. 4 and 5, the rotary shaft 33, ball bearings 34, 35, cylindrical part 37a, recessed part 38c, thrust plate 43, rotary shaft 44, herringbone grooves 44a, and sleeve metal (sleeve bearing) 45 correspond to the rotary shaft 3, ball bearings 4, 5, cylindrical part 7a, recessed part 8c, thrust plate 13, rotary shaft 14, herringbone grooves 14a, sleeve metal 15, respectively.

In the constitution of the embodiments, when the bearings 34, 35, 43, 45 are required to be rigid, the outer diameters B, D of the rotary shafts 33, 44 can be respectively designed to be not smaller than the inner diameter of the center hole 1a of the disc 1, so that the outer diameters B, D of the rotary shafts 33, 44 can be increased. Moreover, the bearings 34, 35, 43, 45 can be made large, whereby the rigidity of the bearings 34, 35, 43, 45 can be enhanced. At the same time, since the disc 1 is not directly fitted with the rotary shaft 33, 44, but with the axial part 8b of the spindle hub 8 secured to the rotary shaft 33, 44, there is no possibility that the lubricating oil of the rotary shaft 33, 44 is adhered to the disc 1.

As described hereinabove, according to the embodiments of the present invention, the disc 1 is not directly fitted with the rotary shaft 3, 14, 33, 44 and fitted with the axial part 8b of the spindle hub 8 to which the rotary shaft 3, 14, 33, 44 is secured. Therefore, a possibility that the lubricating oil of the rotary shaft 3, 14, 33, 44 adheres to the disc 1 is eliminated.

The member to be fitted in the center hole 1a of the disc 1 is not the rotary shaft 3, 14, but the axial part 8b of the spindle hub 8 secured to the rotary shaft 3, 14. Therefore, even though the inner diameter of the center hole 1a of the disc 1 is regulated by standards, it is permissible to design the axial part 8b to conform to the standards. The rotary shaft 3, 14, 33, 44 is freed from the fitting with the center hole 1a of the disc 1, and therefore the outer diameter of the rotary shaft 3, 14, 33, 44 can be designed freely.

The outer diameter of the rotary shaft 3, 14 can be smaller than a value matching the inner diameter of the center hole 1a of the disc 1, which makes it possible to miniaturize the bearings 4, 5, 13, 15, etc. correspondingly to the rotary shaft 3, 14. Accordingly, the motor as a whole becomes compact and thin without the magnetic characteristics deteriorating. If the bearings 34, 35, 43, 45 are necessary to be rigid, the outer diameters B, D of the rotary shafts 33, 44 can be made equal to or larger than the inner diameters A, C of the center holes 1a of the discs 1. That is, the outer diameters B, D of the rotary shafts 33, 44 can be increased, and at the same time the bearings 34, 35, 43, 45 can be enlarged to be more rigid.

Furthermore, when the bearing supporting the rotary shaft 14, 44 is constituted by the hydro-dynamic bearing 13, 14a, 15, 43, 44a, 45, the spindle motor showing such characteristics as consuming low power, low noises, long service life, etc. is realized inexpensively without lowering the magnetic characteristics.

Figure 3:
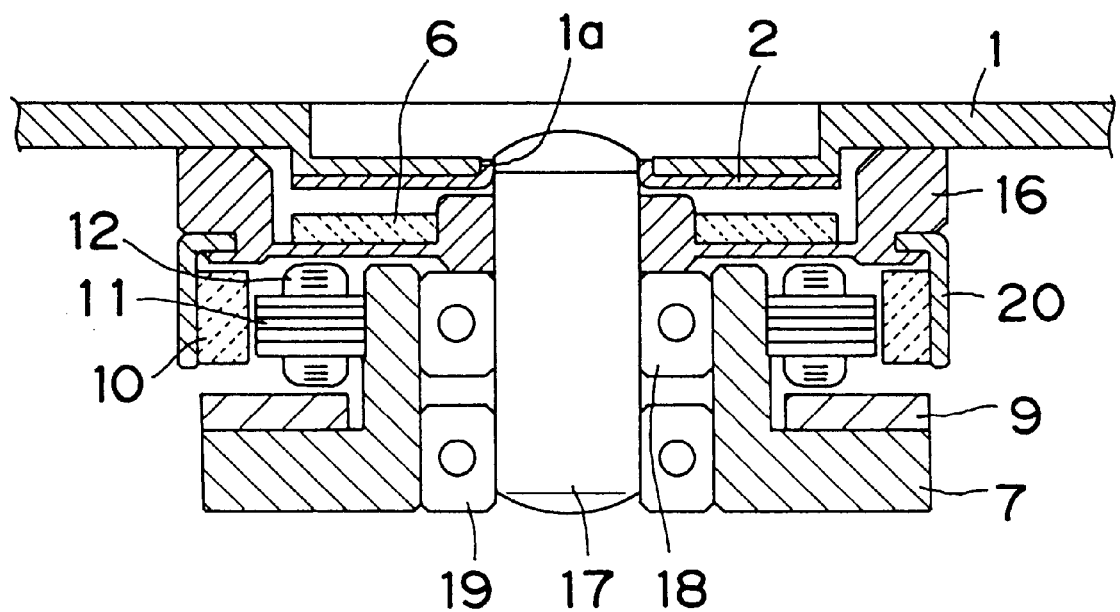
FIG. 3 is a sectional view showing a structure of a spindle motor of a conventional example.

Although the spindle hub is an integrated unit of the hub loading the disc thereon and the rotary frame in the foregoing embodiments, it is needless to say that the present invention is applicable to such a structure that the hub and the rotary frame are separate and coupled with each other as shown in FIG. 3.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magneto-optic disc-driving spindle motor comprising:

a rotary shaft;

bearings supporting said rotary shaft for free rotation; and a spindle hub having said rotary shaft fixed thereto, said spindle hub comprising a magneto-optic disc loading face for receiving a magneto-optic disc thereon and an axial part that is to be fitted into a center hole of a magneto-optic disc;

wherein said rotary shaft has an outer diameter at a position where said bearings support said rotary shaft that is smaller than an outer diameter of said axial part of said spindle hub;

wherein said axial part of said spindle hub is imperforate.

2. The motor of claim 1, wherein said bearings comprise a ball bearing.

3. The motor of claim 1, wherein said bearings comprise a sleeve metal supporting said rotary shaft in a radial direction of said shaft and a thrust plate supporting said rotary shaft in an axial direction of said rotary shaft.

4. The motor of claim 3, wherein said bearings comprise a hydro-dynamic bearing comprising a herringbone groove in one of said rotary shaft and said sleeve metal.

5. A magneto-optic disc-driving spindle motor comprising:

a rotary shaft having an axial extent and an axial upper end and an axial lower end;

bearings supporting said rotary shaft for free rotation;

a spindle hub comprising (a) an upper side defining a magneto-optic disc loading face for receiving and supporting a magneto-optic disc and an axial part that is to be fitted into a center hole of the magneto-optic disc, and (b) a lower side;

a stator core that is fixed relative to said bearings;

a driving magnet fixed relative to said spindle hub; and a connection between said axial upper end of said rotary shaft and said lower side of said spindle hub fixing said spindle hub to said rotary shaft;

wherein said rotary shaft has an outer diameter at a position where said bearings support said rotary shaft that is smaller than an outer diameter of said axial part of said spindle hub;

wherein said axial part of said spindle hub is imperforate.

6. The motor of claim 5, wherein said connection comprises a recess formed in said lower side of said spindle hub, said rotary shaft being fixed in said recess of said lower side of said spindle hub.

7. The motor of claim 6, wherein said recess has an inner diameter that is smaller that the outer diameter of said axial part.

8. The motor of claim 5, wherein said spindle hub further comprises a clamp magnet on said upper side thereof for magnetically securing the magneto-optic disc to said loading face.

9. The motor of claim 8, wherein said spindle hub further comprises an inner face having said driving magnet mounted thereon, said bearings are mounted on a bracket having a cylindrical part, and said stator core is mounted to said cylindrical part of said bracket opposite to said driving magnet.

10. A magneto-optic disc-driving spindle motor as claimed in claim 1, wherein said magneto-optic disc loading face is formed as an integral component of said spindle hub.

11. A magneto-optic disc-driving spindle motor as claimed in claim 5, wherein said magneto-optic disc loading face is formed as an integral component of said spindle hub.

12. A magneto-optic disc-driving spindle motor comprising:

a rotary shaft;

bearings supporting said rotary shaft for free rotation; and a spindle hub having said rotary shaft fixed thereto, said spindle hub comprising a magneto-optic disc loading face for receiving a magneto-optic disc thereon and an axial part that is to be fitted into a center hole of a magneto-optic disc;

wherein said rotary shaft has an outer diameter at a position where said bearings support said rotary shaft that is smaller that an outer diameter of said axial part of said spindle hub;

wherein said magneto-optic disc loading face is diametrically spaced from said axial part with respect to said spindle hub; wherein said spindle hub has an upper side and a lower side, wherein said magneto-optic disc loading face is a surface of said upper side and wherein said spindle hub is imperforate diametrically inside of said magneto-optic disc loading face and between said upper side an said lower side thereof.

13. A magneto-optic disc-driving spindle motor comprising:

a rotary shaft having an axial extent and an axial upper end and an axial lower end;

bearings supporting said rotary shaft for free rotation;

a spindle hub comprising (a) an upper side defining a magneto-optic disc loading face for receiving and supporting a magneto-optic disc and an axial part that is to be fitted into a center hole of the magneto-optic disc, and (b) a lower side;

a stator core that is fixed relative to said bearings;

a driving magnet fixed relative to said spindle hub; and a connection between said axial upper end of said rotary shaft and said lower side of said spindle hub fixing said spindle hub to said rotary shaft;

wherein said rotary shaft has an outer diameter at a position where said bearings support said rotary shaft that is smaller than an outer diameter of said axial part of said spindle hub;

wherein said magneto-optic disc loading face is diametrically spaced from said axial part with respect to said spindle hub, wherein said magneto-optic disc loading face is a surface of said upper side and wherein said spindle hub is imperforate diametrically inside of said magneto-optic disc loading face and between said upper side and said lower side thereof.

* * * * *